(12) United States Patent
Chen

(10) Patent No.: US 11,076,722 B2
(45) Date of Patent: Aug. 3, 2021

(54) COLLAPSIBLE VEGETABLE GRATING PLATE AND VEGETABLE GRATER

(71) Applicant: SHUANGMA PLASTIC MANUFACTURING INC., Taizhou (CN)

(72) Inventor: Cuihong Chen, Taizhou (CN)

(*) Notice: Subject to any disclaimer, the term of this patent is extended or adjusted under 35 U.S.C. 154(b) by 177 days.

(21) Appl. No.: 16/512,619

(22) Filed: Jul. 16, 2019

(65) Prior Publication Data

US 2020/0113389 A1 Apr. 16, 2020

(30) Foreign Application Priority Data

Oct. 16, 2018 (CN) .......................... 201821678926.6

(51) Int. Cl.
*A47J 43/25* (2006.01)
(52) U.S. Cl.
CPC ..................................... *A47J 43/25* (2013.01)
(58) Field of Classification Search
CPC ................................ A47J 43/25; A47J 43/255
See application file for complete search history.

(56) References Cited

U.S. PATENT DOCUMENTS

| | | | | |
|---|---|---|---|---|
| 5,312,054 | A * | 5/1994 | Feer | A47J 43/25 241/273.2 |
| 7,107,890 | B2 | 9/2006 | Debuyer | |
| 2005/0006505 | A1* | 1/2005 | McNeeley | A47J 43/25 241/95 |
| 2005/0252387 | A1* | 11/2005 | Cornfield | B26D 3/185 99/500 |
| 2007/0119995 | A1 | 5/2007 | Yamanaka et al. | |
| 2008/0029631 | A1 | 2/2008 | Boerner et al. | |
| 2012/0198980 | A1* | 8/2012 | Bagley | B26D 3/283 83/699.51 |
| 2019/0174958 | A1* | 6/2019 | Guetta | A24F 23/02 |

FOREIGN PATENT DOCUMENTS

| | | | |
|---|---|---|---|
| CN | 201248638 Y | 6/2009 | |
| CN | 203341599 U | * 12/2013 | ............. A47J 43/25 |
| CN | 207928232 U | 10/2018 | |
| EP | 0628386 B1 | 2/2000 | |
| EP | 2902158 B1 | 9/2016 | |
| KR | 1020070055468 A | 2/2007 | |

OTHER PUBLICATIONS

English translate (CN203341599U), retrieved date Feb. 12, 2021.*

* cited by examiner

*Primary Examiner* — Adam J Eiseman
*Assistant Examiner* — Mohammed S. Alawadi
(74) *Attorney, Agent, or Firm* — Erson IP (Nelson IP)

(57) ABSTRACT

The invention discloses a collapsible vegetable grating plate and a vegetable grater, and relates to the technical field of vegetable processing appliances. The key point of the technical solution of the utility model is: the collapsible vegetable grating plate comprises a main body; the main body comprises an upper collapsible portion, a vegetable grating portion and a lower collapsible portion which are hinged successively; when the vegetable grating portion is simultaneously abutted against the upper collapsible portion and the lower collapsible portion, planes for carrying vegetables in the upper collapsible portion, the vegetable grating portion and the lower collapsible portion are located in the same plane; and the vegetable grating portion is provided with a cutting blade used for cutting the vegetables.

8 Claims, 4 Drawing Sheets

COLLAPSIBLE VEGETABLE GRATING PLATE AND VEGETABLE GRATER

CROSS-REFERENCE TO RELATED APPLICATIONS

This application claims priority to Chinese Patent Application No. 201821678926.6 with a filing date of Oct. 16, 2018. The content of the aforementioned applications, including any intervening amendments thereto, are incorporated herein by reference.

TECHNICAL FIELD

The utility model relates to the technical field of vegetable processing appliances, and particularly relates to a collapsible vegetable grating plate and a vegetable grater.

BACKGROUND OF THE PRESENT INVENTION

At present, the Chinese Patent with publication No. CN204049395U discloses a vegetable grater for slicing and slitting vegetables, which comprises a bracket body and a supporting leg hinged to an end part of the bracket body. A vegetable grating plate with a grater is arranged on an end part of the bracket body away from a bracket. However, the bracket body in the vegetable grating plate is formed by integrated injection molding. Thus, when the vegetable grating plate is not used, a large space is occupied and it is inconvenient to ship the vegetable grating plate.

SUMMARY OF PRESENT INVENTION

In view of the defects in the prior art, the first purpose of the utility model is to provide a collapsible vegetable grating plate having the advantages of collapsible performance of the vegetable grating plate when not used, less space occupation and convenient shipping.

The above technical purpose of the utility model is achieved through the following technical solution: a collapsible vegetable grating plate comprises a main body, wherein the main body comprises an upper collapsible portion, a vegetable grating portion and a lower collapsible portion which are hinged successively; when the vegetable grating portion is simultaneously abutted against the upper collapsible portion and the lower collapsible portion, planes for carrying vegetables in the upper collapsible portion, the vegetable grating portion and the lower collapsible portion are located in the same plane; and the vegetable grating portion is provided with a cutting blade used for cutting the vegetables.

Through the above technical solution, when the vegetable grating plate is not used, the upper collapsible portion and the lower collapsible portion are controlled to bend towards the vegetable grating portion so that the length of the vegetable grating plate is reduced and a spacing among the upper collapsible portion, the vegetable grating portion and the lower collapsible portion is relatively small. In this way, the vegetable grating plate occupies less space and is convenient to ship.

Preferably, the vegetable grating portion comprises a vegetable grating frame and a blade plate; both ends of the vegetable grating frame are respectively hinged to the upper collapsible portion and the lower collapsible portion; the vegetable grating frame is provided with a placing groove; one end of the placing groove transversely penetrates through a side wall of the vegetable grating frame; the blade plate is embedded into the placing groove; the thickness of the blade plate is the same as the depth of the placing groove; and the cutting blade is installed at a top surface of the blade plate.

Through the above technical solution, when the vegetable grating plate is to be used, the blade plate equipped with the cutting blade is put into the placing groove. When the vegetable grating plate is not used, the blade plate equipped with the cutting blade is taken out of the placing groove. In this way, the cutting blade is difficult to be damaged, which improves the service life of the vegetable grating plate to some extent.

Preferably, a groove is formed at an inner groove wall of the placing groove; a convex strip is integrally formed on the side wall of the blade plate; and the convex strip extends into the groove and is abutted against an inner groove wall of the groove.

Through the above technical solution, when the blade plate is located inside the placing groove, the convex strip on the blade plate extends into the groove and an outer side wall of the convex strip is abutted against the inner groove wall of the groove. In this way, in the process of using the vegetable grating plate, the blade plate is difficult to separate from the groove, so that the use of the vegetable grating plate is more convenient and smooth.

Preferably, the upper collapsible portion is provided with a first limiting groove; the lower collapsible portion is provided with a second limiting groove; the vegetable grating frame comprises a bracket hinged to the upper collapsible portion and the lower collapsible portion, and a blade frame clamped to the bracket; a first limiting block and a second limiting block are integrally formed on a bottom surface of the blade frame; the first limiting block is embedded into the first limiting groove and is used for limiting the blade frame to rotate relative to the upper collapsible portion; and the second limiting block is embedded into the second limiting groove and is used for limiting the blade frame to rotate relative to the lower collapsible portion.

Through the above technical solution, when the vegetable grating plate is to be used, firstly, the upper collapsible portion and the lower collapsible portion are controlled to rotate away from a side of the vegetable grating portion until the upper collapsible portion, the vegetable grating portion and the lower collapsible portion are located on the same straight line. Then, the blade frame is clamped to the bracket, and the first limiting block on the blade frame is controlled to extend into the first limiting groove; and the second limiting block extends into the second limiting groove. In this way, in the process of using the vegetable grating plate, it is difficult for the upper collapsible portion, the vegetable grating portion and the lower collapsible portion to rotate relatively, so that the use of the vegetable grating plate becomes more convenient and smooth. When the vegetable grating plate is not used, it is only necessary to take out the blade frame from the bracket so as to control the upper collapsible portion and the lower collapsible portion to rotate towards a side of the vegetable grating portion.

Preferably, a first positioning strip is protruded inside the first limiting groove; the first limiting block is provided with a first positioning groove into which the first positioning strip is embedded; a second positioning strip is protruded inside the second limiting groove; and the second limiting block is provided with a second positioning groove into which the second positioning strip is embedded.

Through the above technical solution, the blade frame is clamped to the bracket, and the first limiting block extends into the first limiting groove. When the second limiting block extends into the second limiting groove, the first positioning strip in the first limiting groove extends into the first positioning groove and the outer side wall of the first positioning strip is abutted against the inner groove wall of the first positioning groove. The second positioning strip in the second limiting groove extends into the second positioning groove and the outer side wall of the second positioning strip is abutted against the inner groove wall of the second positioning groove. In this way, it is difficult for the blade frame to transversely move during use.

Preferably, a main limiting block is integrally formed on a top surface of the bracket; and convex blocks abutted against the main limiting block are integrally formed on the upper collapsible portion and the lower collapsible portion.

Through the above technical solution, when the vegetable grating plate is to be used, the upper collapsible portion is controlled to rotate away from a side of the vegetable grating portion until the convex block on the upper collapsible portion is abutted against the main limiting block; and the lower collapsible portion is controlled to rotate away from a side of the vegetable grating portion until the convex block on the lower collapsible portion is abutted against the main limiting block. In this way, the use process of the provided vegetable grating plate is more convenient and rapid.

Preferably, a handle is hinged at the upper collapsible portion away from the vegetable grating portion.

Through the above technical solution, the handle is hinged at the upper collapsible portion. In this way, it is convenient to ship the vegetable grating plate.

Preferably, a partition convex plate abutted against the handle is protruded at the upper collapsible portion.

Through the above technical solution, in the process of rotating the handle, the partition convex plate arranged on the upper collapsible portion can be abutted against the handle, thereby limiting the rotation of the handle.

Preferably, the bottom of the main body is provided with a plurality of openings; and the width of the openings is gradually decreased towards a side of the main body.

Through the above technical solution, when the vegetable grating plate is used, a container that carries vegetables is put below the vegetable grating plate and the edge of the container is controlled to extend into the openings, so that it is difficult for the container and the vegetable grating plate to move relatively and so that the use of the vegetable grating plate is more convenient and smooth.

The first purpose of the utility model is to provide a vegetable grater having the advantages of less space occupation when not used and convenient shipping.

The above technical purpose of the utility model is achieved through the following technical solution: a vegetable grater comprises the above vegetable grating plate and a vegetable containing basket arranged below the vegetable grating plate.

Through the above technical solution, when the vegetable grater is used, the vegetable containing basket is put below the vegetable grating plate and the edge of the vegetable containing basket opposite to the vegetable grating plate is controlled to extend into the openings. When the vegetable grater is not used, the vegetable containing basket is separated from the vegetable grating plate and then the vegetable grating plate is bent. In this way, the vegetable grater occupies less space.

Figure 1:
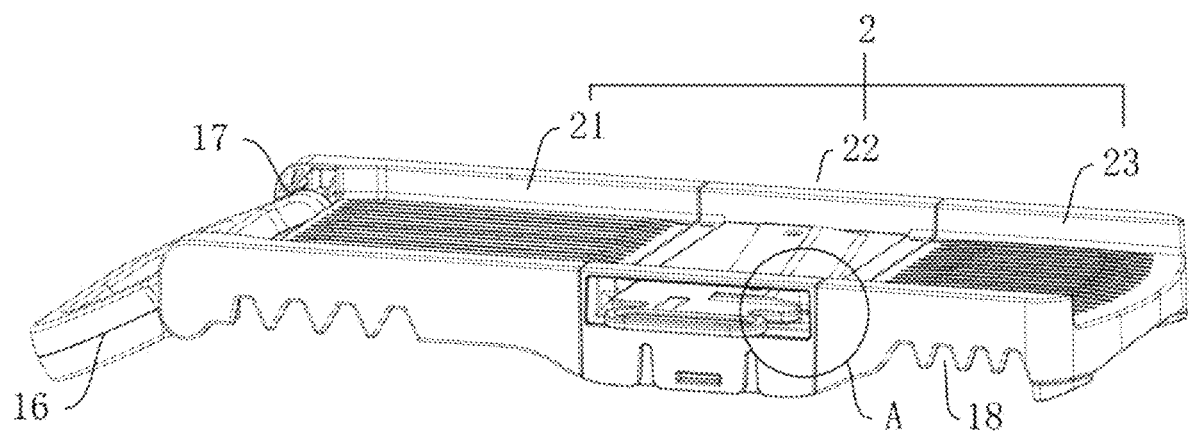
FIG. 1 is a structural schematic diagram of embodiment 1, and is mainly used for showing an external structure of embodiment 1.
Figure 2:
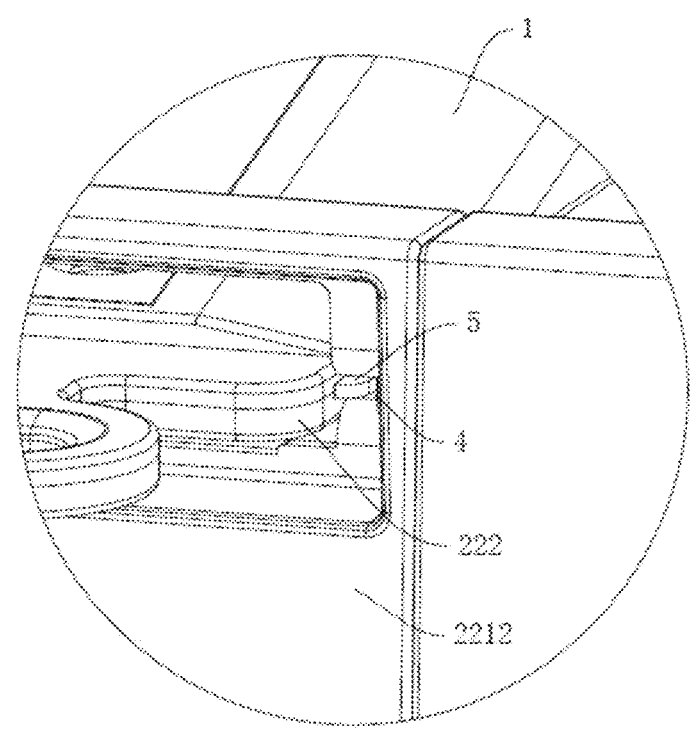
FIG. 2 is an enlarged diagram of A part of FIG. 1.
Figure 3:
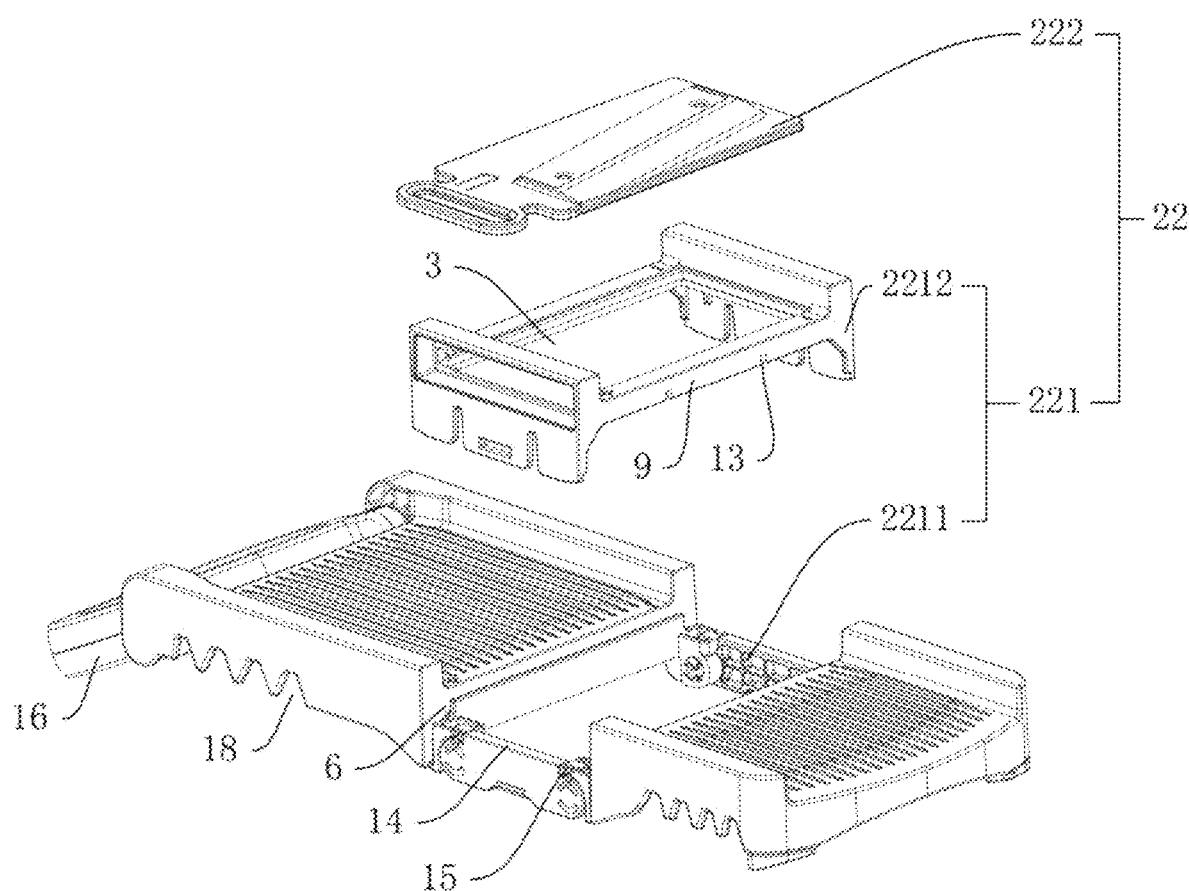
FIG. 3 is an exploded diagram of embodiment 1, and is mainly used for showing the composition of embodiment 1.
Figure 4:
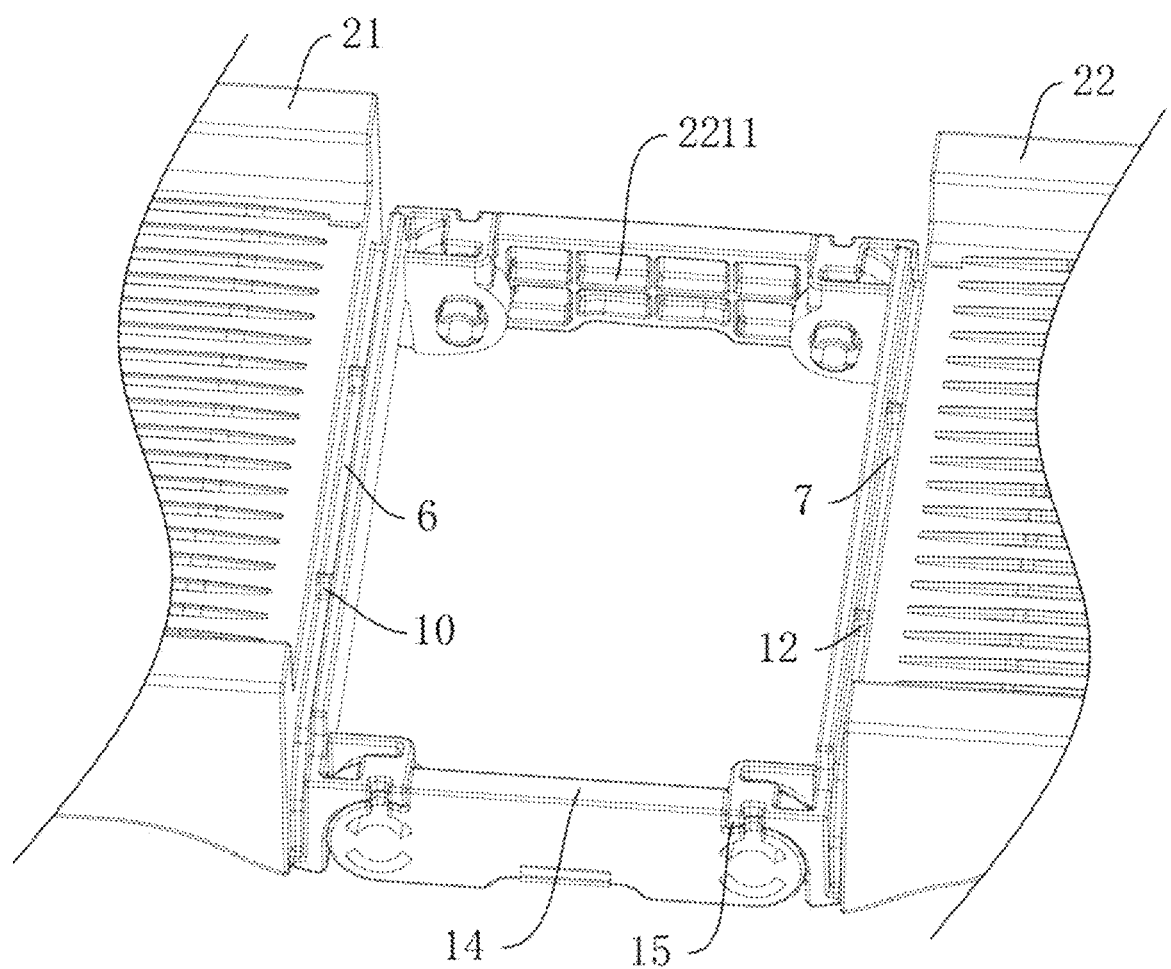
FIG. 4 is a local diagram of a main body, and is mainly used for showing an external structure of a bracket.
Figure 5:
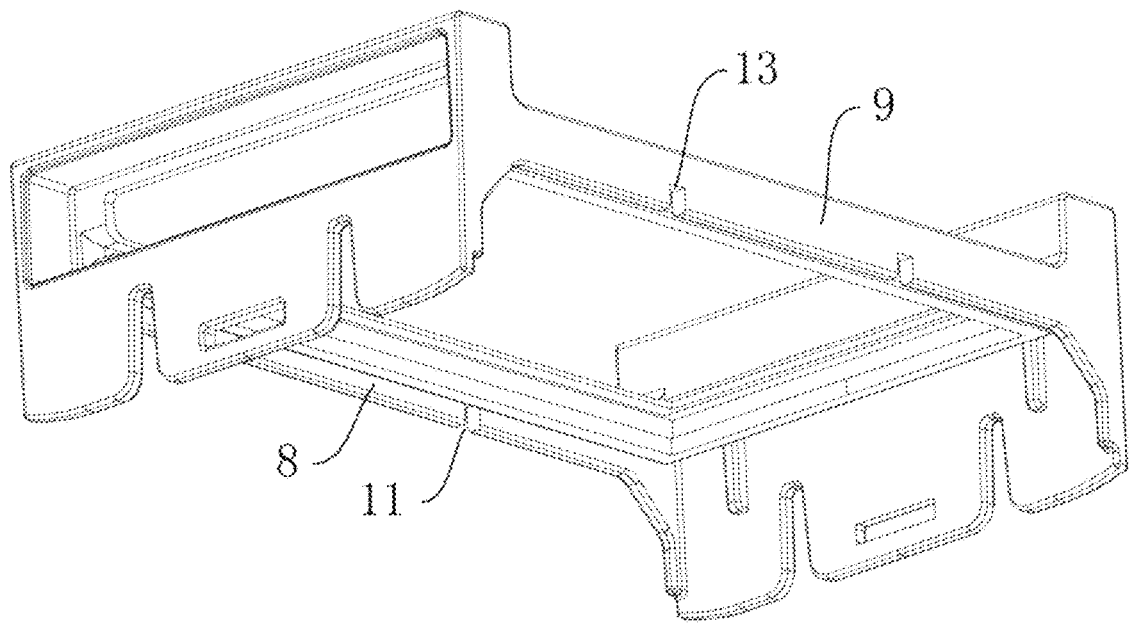
FIG. 5 is a structural schematic diagram of a blade frame, and is mainly used for showing, an external structure of a blade frame.

REFERENCE NUMERALS OF THE DRAWINGS 1 cutting blade; 2 main body; 21 upper collapsible portion; 22 vegetable grating portion; 221 vegetable grating frame; 222 blade plate; 2211 bracket; 2212 blade frame; 23 lower collapsible portion; 3 placing groove; 4 groove; 5 convex strip; 6 first limiting groove; 7 second limiting groove; 8 first limiting block; 9 second limiting block; 10 first positioning strip; 11 first positioning groove; 12 second positioning strip; 13 second positioning groove; 14 main limiting block; 15 convex block; 16 handle; 17 partition convex plate; 18 opening; and 19 vegetable containing basket.

DETAILED DESCRIPTION OF PREFERRED EMBODIMENTS

The utility model is further described below in detail with reference to the drawings.

Embodiment 1

As shown in FIG. 1 to FIG. 5, a collapsible vegetable grating plate comprises a main body 2. The bottom surface of the main body 2 is provided with a plurality of openings 18; and the width of the openings 18 is gradually decreased towards the outer side of the main body 2. The main body 2 comprises an upper collapsible portion 21, a vegetable grating portion 22 and a lower collapsible portion 23 which are hinged successively. When the vegetable grating portion 22 is simultaneously abutted against the upper collapsible portion 21 and the lower collapsible portion 23, upper collapsible portion 21, the vegetable grating portion 22 and the lower collapsible portion 23 are located in the same straight line.

A handle 16 is hinged to the end part of the upper collapsible portion 21 away from the vegetable grating portion 22. A partition convex plate 17 is integrally formed on an end surface of the upper collapsible portion 21 that faces the handle 16, and the partition convex plate 17 is abutted against the handle 16, thereby limiting the ultimate rotation position of the handle 16. The upper collapsible portion 21 is provided with a first limiting groove 6 near the vegetable grating portion 22, and the first limiting groove 6 extends along a direction perpendicular to the top surface of the upper collapsible portion 21. A plurality of first positioning strips 10 are protruded at the bottom of the first limiting groove 6, and the plurality of first positioning strips 10 are uniformly distributed along the lengthwise direction of the first limiting groove 6.

The lower collapsible portion 23 is provided with a second limiting groove 7 near the vegetable grating portion 22, and the second limiting groove 7 extends along a direction perpendicular to the top surface of the lower collapsible portion 23. A plurality of second positioning strips 12 are protruded at the bottom of the second limiting groove 7, and the plurality of second positioning strips 12 are uniformly distributed along the lengthwise direction of the second limiting groove 7.

The vegetable grating portion 22 comprises a vegetable grating frame 221 and a blade frame 2212. The vegetable grating frame 221 comprises a bracket 2211 and a blade frame 2212.

Both ends of the bracket 2211 in the lengthwise direction are respectively hinged to the upper collapsible portion 21 and the lower collapsible portion 23. A main limiting block 14 is integrally formed on a top surface of the bracket 2211; and the side wall of the main limiting block 14 is flush with the side wall of the bracket 2211. A convex block 15 is integrally formed on the end part of the upper collapsible portion 21 that faces the bracket 2211: and the convex block 15 on the upper collapsible portion 21 is abutted against the side wall of the main limiting block 14 that faces the upper collapsible portion 21. When the convex block 15 on the upper collapsible portion 21 is abutted against the main limiting block 14, the upper collapsible portion 21 and the bracket 2211 are located on the same straight line. A convex block 15 is integrally formed on the end part of the lower collapsible portion 23 that faces the bracket 2211; and the convex block 15 on the lower collapsible portion 23 is abutted against the side wall of the main limiting block 14 that faces the lower collapsible portion 23. When the convex block 15 on the lower collapsible portion 23 is abutted against the main limiting block 14, the lower collapsible portion 23 and the bracket 2211 are located on the same straight line.

The blade frame 2212 is clamped to the bracket 2211. A first limiting block 8 and a second limiting block 9 that are parallel to each other are integrally formed on the bottom surface of the blade frame 2212. The first limiting block 8 extends into the first limiting groove 6 and the outer side wall of the first limiting block 8 is abutted against the inner groove wall of the first limiting groove 6. The bottom of the first limiting block 8 is provided with a plurality of first positioning groves 11 into which the first positioning strips 10 extend; and when the first limiting block 8 extends into the first positioning groves 11, the outer side wall of the first limiting block 8 is abutted against the inner groove walls of the first positioning groves 11. The second limiting block 9 extends into the second limiting groove 7 and the outer side wall of the second limiting block 9 is abutted against the inner groove wall of the second limiting groove 7. The bottom of the second limiting block 9 is provided with a plurality of second positioning groves 13 into which the second positioning strips 12 extend; and when the second limiting block 9 extends into the second positioning groves 13, the outer side wall of the second limiting block 9 is abutted against the inner groove walls of the second positioning groves 13.

The top surface of the blade frame 2212 is provided with a placing groove 3, and one end of the placing groove 3 transversely penetrates through the side wall of the blade frame 2212. A groove 4 is formed at the inner side wall of the placing groove 3, and the groove 4 is parallel to the bottom surface of the placing groove 3.

The blade plate 222 is installed inside the placing groove 3, and the outer side wall of the blade plate 222 is abutted against the inner groove wall of the placing groove 3. The thickness of the blade plate 222 is the same as the depth of the placing groove 3. A convex strip 5 is integrally formed on the side wall of the blade plate 222 opposite to the groove 4. The convex strip 5 extends into the corresponding groove 4 and is abutted against the inner groove wall of the groove 4. A cutting blade 1 used for cutting vegetables is connected to the top surface of the blade plate 222 through a screw.

The specific use mode of the collapsible vegetable grating plate is as follows: when the vegetable grating plate is not used, the blade plate 222 is pulled at first, so that the blade plate 222 moves towards a side away from the blade frame 2212 and is finally separated from the blade frame 2212; next, a pulling force is applied to the blade frame 2212, so that the blade frame 2212 moves towards a side away from the bracket 2211; and when the first limiting block 8 is separated from the first limiting groove 6, and the second limiting block 9 is separated from the second limiting groove 7, the upper collapsible portion 21 and the lower collapsible portion 23 are controlled to rotate towards a side of the bracket 2211.

Embodiment 2

Figure 6:
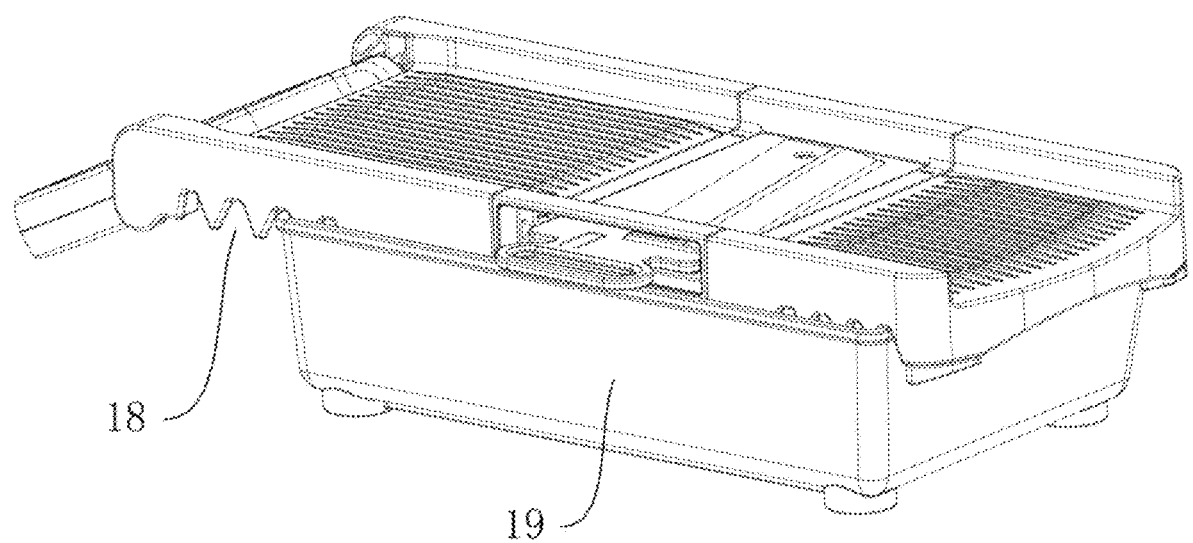
FIG. 6 is a structural schematic diagram of embodiment 2, and is mainly used for showing an external structure of embodiment 2.

As shown in FIG. 6, a vegetable grater comprises the collapsible vegetable grating plate in embodiment 1, and a vegetable containing basket 19 arranged below the vegetable grating plate. The vegetable containing basket 19 is square, and the edge of the vegetable containing basket 19 opposite to the vegetable grating plate extends into the openings 18.

The above only describes exemplary embodiments of the utility model, and is not intended to limit the protection scope of the utility model. The protection scope of the utility model is determined by the appended claims.

I claim:

1. A collapsible vegetable grating plate, comprising a main body; wherein the main body comprises an upper collapsible portion, a vegetable grating portion and a lower collapsible portion hinged successively; when the vegetable grating portion is simultaneously abutted against the upper collapsible portion and the lower collapsible portion, planes for carrying vegetables in the upper collapsible portion, the vegetable grating portion and the lower collapsible portion are located in the same plane; and the vegetable grating portion is provided with a cutting blade used for cutting the vegetables;

wherein the vegetable grating portion comprises a vegetable grating frame and a blade plate; both ends of the vegetable grating frame are respectively hinged to the upper collapsible portion and the lower collapsible portion; the vegetable grating frame is provided with a placing groove; one end of the placing groove transversely penetrates through a side wall of the vegetable grating frame; the blade plate is embedded into the placing groove; the thickness of the blade plate is the same as the depth of the placing groove; and the cutting blade is installed at a top surface of the blade plate;

the upper collapsible portion is provided with a first limiting groove; the lower collapsible portion is provided with a second limiting groove; the vegetable grating frame comprises a bracket hinged to the upper collapsible portion and the lower collapsible portion, and a blade frame clamped to the bracket a first limiting block and a second limiting block are integrally formed on a bottom surface of the blade frame; the first limiting block is embedded into the first limiting groove and is used for limiting the blade frame to rotate relative to the upper collapsible portion; and the second limiting block is embedded into the second limiting groove and is used for limiting the blade frame to rotate relative to the lower collapsible portion.

2. The collapsible vegetable grating plate of to claim 1, wherein a groove is formed at an inner groove wall of the placing groove; a convex strip is integrally formed on the side wall of the blade plate; and the convex strip extends into the groove and is abutted against an inner groove wall of the groove.

3. The collapsible vegetable grating plate of claim 1, wherein a first positioning strip is protruded inside the first limiting groove; the first limiting block is provided with a first positioning groove into which the first positioning strip is embedded; a second positioning strip is protruded inside the second limiting groove; and the second limiting block is provided with a second positioning groove into which the second positioning strip is embedded.

4. The collapsible vegetable grating plate of claim 1, wherein a main limiting block is integrally formed on a top surface of the bracket; and convex blocks abutted against the main limiting block are integrally formed on the upper collapsible portion and the lower collapsible portion.

5. The collapsible vegetable grating plate of claim 1, wherein a handle is hinged at the upper collapsible portion away from the vegetable grating portion.

6. The collapsible vegetable grating plate of claim 5, wherein a partition convex plate (17) abutted against the handle (16) is protruded at the upper collapsible portion (21).

7. The collapsible vegetable grating plate of claim 1, wherein the bottom of the main body is provided with a plurality of openings; and the width of the openings is gradually decreased towards a side of the main body.

8. A vegetable grater, comprising the collapsible vegetable grating plate of claim 1, and a vegetable containing basket arranged below the vegetable grating plate.

* * * * *